United States Patent [19]

Narita et al.

[11] 4,428,483

[45] Jan. 31, 1984

[54] DISC ACCOMMODATING CASE

[75] Inventors: Osamu Narita; Takushi Hayashi, both of Yokohama, Japan

[73] Assignee: Victor Company of Japan, Ltd., Yokohama, Japan

[21] Appl. No.: 276,667

[22] Filed: Jun. 23, 1981

[30] Foreign Application Priority Data

Jun. 27, 1980 [JP] Japan .............................. 55-90304[U]

[51] Int. Cl.³ ............................................ B65D 73/00
[52] U.S. Cl. .................................... 206/459; 206/309; 206/444; 360/132; 360/133
[58] Field of Search ............... 206/309, 310, 311, 312, 206/313, 444, 459, 555, 556, 453; 360/131, 132, 133, 135, 99

[56] References Cited

U.S. PATENT DOCUMENTS

| | | | |
|---|---|---|---|
| 1,865,485 | 7/1932 | Sas | 206/453 |
| 1,940,088 | 12/1933 | Harrison | 206/309 |
| 2,033,998 | 3/1936 | Prager | 206/459 |
| 2,353,369 | 7/1944 | Sears | |
| 2,601,426 | 6/1952 | Baumann | 206/453 |
| 3,112,966 | 12/1963 | Reid | 206/309 |
| 3,561,671 | 2/1971 | Minot, Jr. | 206/312 |
| 3,590,771 | 7/1971 | Lutsch | 206/459 |
| 3,812,960 | 5/1974 | Falletta et al. | |
| 3,932,895 | 1/1976 | Ward | |
| 3,951,264 | 10/1974 | Heidecker et al. | 206/444 |
| 4,138,703 | 2/1979 | Stave et al. | 206/444 |
| 4,234,079 | 11/1980 | Otake | |
| 4,266,784 | 5/1981 | Torrington | 206/444 |

FOREIGN PATENT DOCUMENTS

| | | |
|---|---|---|
| 1943967 | 5/1970 | Fed. Rep. of Germany . |
| 1949736 | 4/1971 | Fed. Rep. of Germany . |
| 2037800 | 2/1972 | Fed. Rep. of Germany . |
| 2709988 | 9/1978 | Fed. Rep. of Germany . |
| 2820922 | 11/1978 | Fed. Rep. of Germany ...... 206/312 |
| 1054533 | 2/1954 | France . |
| 1460331 | 1/1977 | United Kingdom . |
| 1485690 | 9/1977 | United Kingdom . |
| 2016793A | 9/1979 | United Kingdom . |
| 850799 | 10/1980 | United Kingdom . |
| 1595977 | 8/1981 | United Kingdom . |

Primary Examiner—William T. Dixson, Jr.
Assistant Examiner—David T. Fidei
Attorney, Agent, or Firm—Louis Bernat

[57] ABSTRACT

A disc accommodating case comprises an opaque jacket having an opening portion at one end thereof, for accommodating a disc recorded with information signals within an internal space formed in the jacket, and a member for closing the opening portion of the jacket accommodating the disc. The disc is provided with a display portion for displaying the surface side of the disc, at a predetermined position thereof. The jacket has a display window provided at a position opposing a part of the display portion of the disc accommodated within the jacket, for enabling the part of the display portion to be seen through the display window from outside the jacket.

3 Claims, 6 Drawing Figures

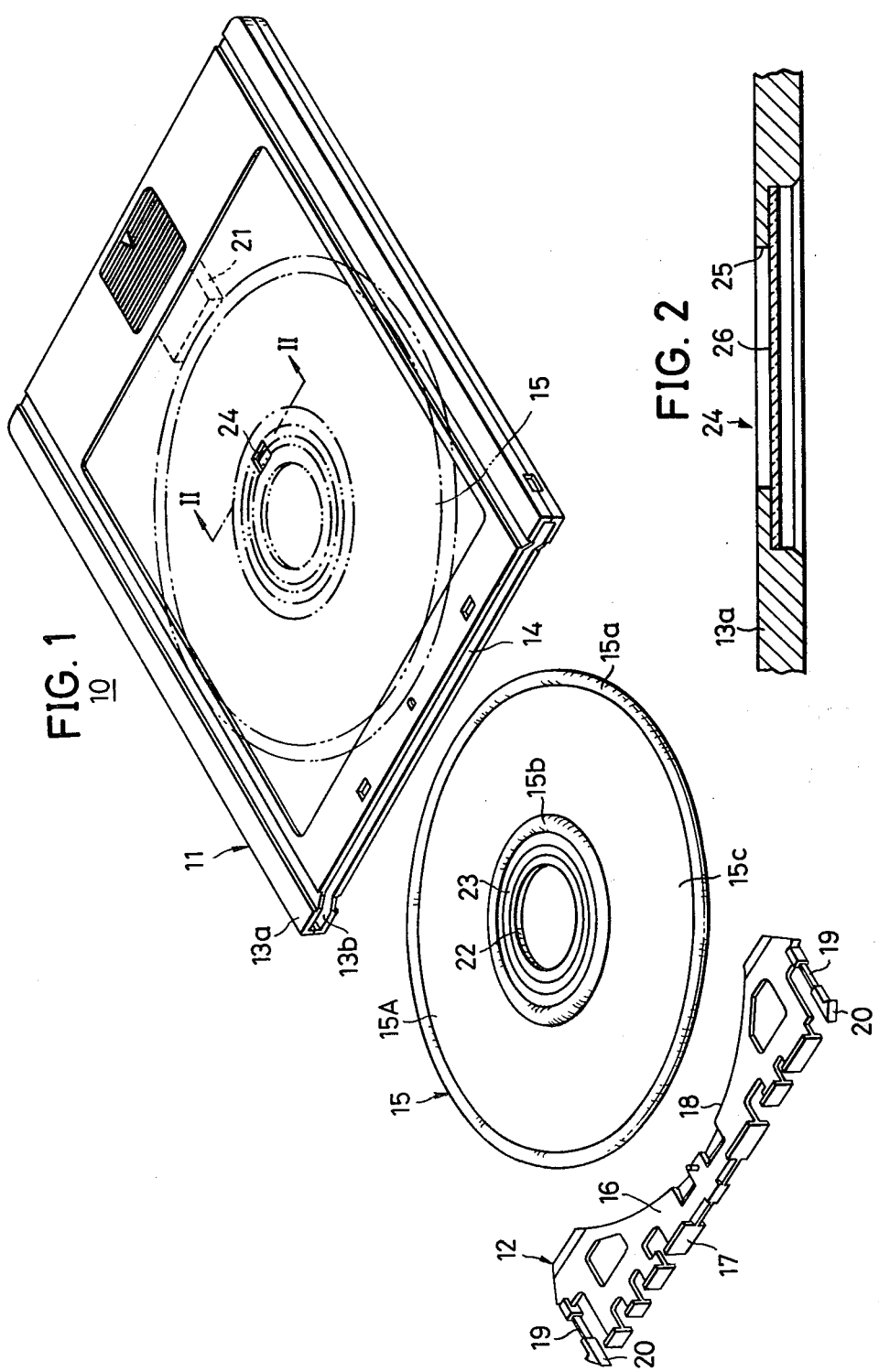

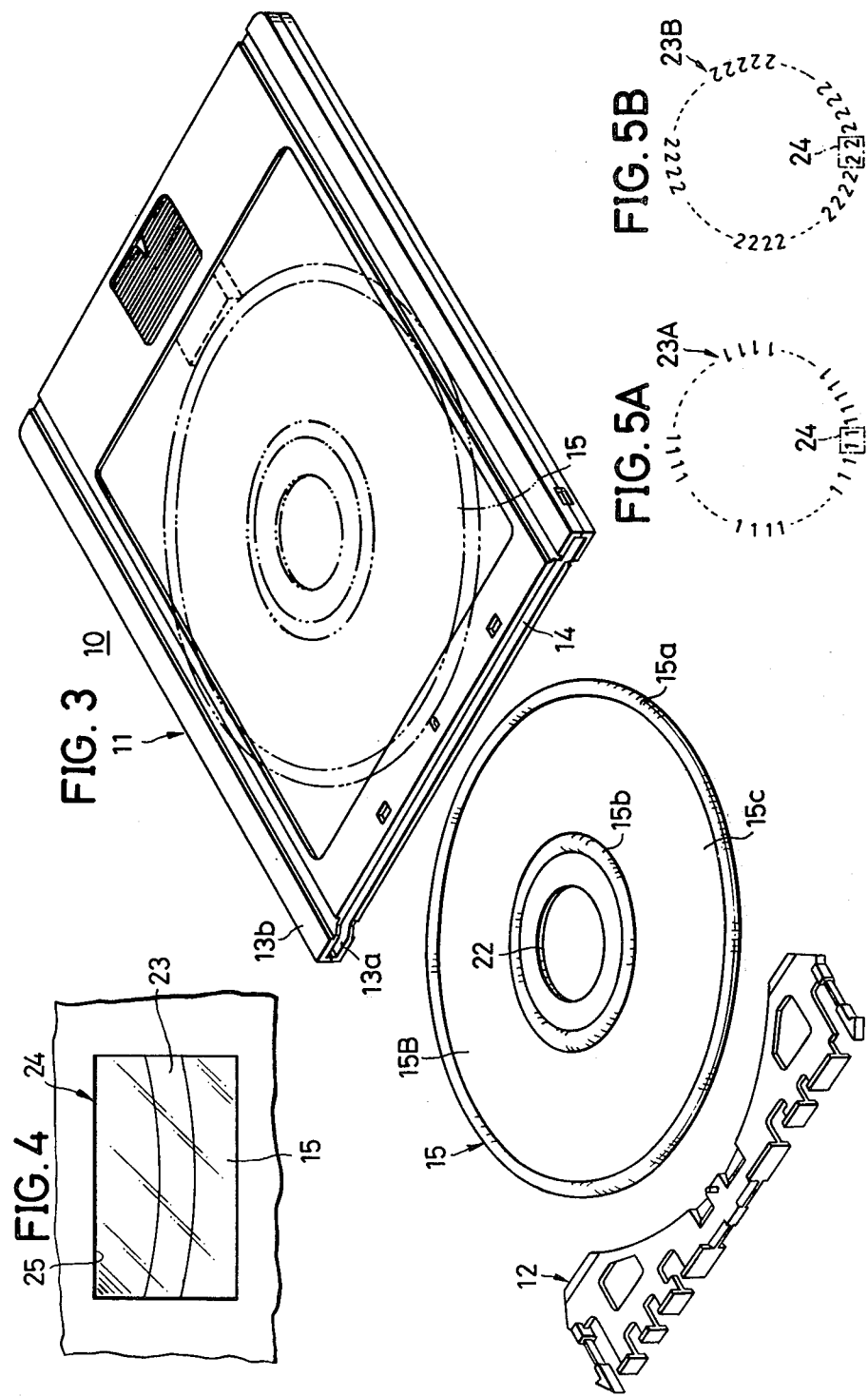

DISC ACCOMMODATING CASE

BACKGROUND OF THE INVENTION

The present invention generally relates to cases for accommodating rotary recording mediums (hereinafter referred to as discs), and more particularly to a disc accommodating case which is constructed to display the surface side of the disc accommodated within the case.

Generally, a disc which is recorded with information signals such as a video signal and an audio signal with high density, is accommodated within a disc case in order to protect the surface of the disc from dirt, scratches, and the like. Conventionally, there was a disc case comprising a rigid jacket for accommodating a disc, and a tray having a front part which is engaged by engaging means upon complete insertion of the disc case within a reproducing apparatus and an annular or ring portion fixed to the front part for encircling the outer periphery of the disc. The above reproducing apparatus which operates together with the disc case accommodating the disc, is constructed so that when this disc case is inserted within the reproducing apparatus to a predetermined position, the engaging means of the reproducing apparatus engages to and holds onto the front part of the tray. Hence, when the jacket is pulled out from within the reproducing apparatus, the disc is held by the annular portion of the tray and relatively slipped out from the jacket at the above predetermined position, and the outer peripheral edge part of the disc rests on and is supported by a supporting mechanism within the reproducing apparatus. Then, a turntable relatively rises within the inner side of the supporting mechanism, and the disc is placed onto and is unitarily rotated with the turntable, to perform the reproduction. After completion of the reproduction, when the empty jacket is inserted into the reproducing apparatus, the disc is relatively inserted into the jacket together with the annular portion of the tray, and the engagement of the engaging means is released. Accordingly, when the jacket is pulled out from the reproducing apparatus, the disc and the tray is obtained outside the reproducing apparatus together with the jacket in a state in which the disc and the tray is incased inside the jacket. Therefore, the disc is not directly handled by the operator when the disc is pulled out relatively from the jacket, and when the disc is inserted relatively into the jacket to be accommodated therein.

Thus, in the above disc case, for use with the conventional reproducing apparatus, the peripheral side surface of the disc is held by the engaged annular portion of the tray and the disc remains within the reproducing apparatus upon pulling of the jacket outside the reproducing apparatus. Accordingly, the relationship between the surface side of the tray and the surface side of the disc left within the reproducing apparatus does not change. Moreover, the relationship between the surface side of the tray and the surface side of the disc is constant when the jacket is inserted into the reproducing apparatus to accommodate the disc within the jacket.

On the other hand, an empty jacket is not necessarily inserted into the reproducing apparatus in a state where the relationship between the surface side of the empty jacket and the playing surface side of the disc loaded within the reproducing apparatus is constant. Further, the jacket is generally formed from an opaque synthetic resin, and even when labels are adhered onto the disc as in the conventional audio records, the disc cannot be seen directly. Accordingly, a display is required for displaying the particular surface side of the disc accommodated within the jacket, with respect to the surface side of the jacket.

Hence, conventionally, displays "1" and "2" (or "A" and "B") were respectively provided at the lid portion of the tray, in order to display which surface side of the disc is the "1" or the "2" ("A" or the "B") side. Accordingly, the displays on the tray were exposed as they are outside the jacket, in a state where the tray is engaged with the jacket. That is, the surface side of the disc is indirectly displayed by the display on the surface side of the tray, by using the fact that the relationship between the surface side of the disc and the surface side of the tray is constant regardless of the disc reproducing and disc accommodating operations performed.

Therefore, in a case where the disc and the tray are accommodated within the jacket in an erroneous state where one of the disc and the tray is in an opposite relationship with respect to a predetermined relationship between the surface sides of the disc and the tray (when the surface side "1" of the disc coincides with the surface side "2" of the tray, for example), during a process to accommodate the disc within the jacket in a manufacturing stage, the surface side of the disc displayed on the tray and the actual surface side of the disc displayed on the disc become opposite to each other. Thus, a correct surface side display could not be obtained when the relationship between the surface sides of the disc and the tray is not of a predetermined relationship, since the conventional surface side display is not a direct display and the surface side of the disc is indirectly displayed by the display on the tray.

Similarly, the correct surface side display cannot be obtained when the tray and/or the disc and manually pulled out from the jacket for a particular purpose, and then, the tray and/or the disc are erroneously accommodated within the jacket in a state where the relationship between the surface sides of the disc and the tray is of an opposite relationship as in the above described case.

In addition, attempts have been made to form the whole jacket from a transparent or semi-transparent synthetic resin. In this case, the surface side display label is adhered to the disc, and the display label of the disc which is accommodated within the jacket, can be seen through the jacket to be recognized. However, the transparent synthetic resin is inferior compared to the opaque synthetic resin with respect to durability, that is, durability against shock and heat. Moreover, the cost of the transparent synthetic resin is high, and is difficult to put to practical use.

SUMMARY OF THE INVENTION

Accordingly, a general object of the present invention is to provide a novel and useful disc accommodating case in which the above described problems have been overcome.

Another and more specific object of the present invention is to provide a disc accommodating case capable of directly displaying the surface side of a disc. According to the disc case of the present invention, the correct surface side display can always be obtained, since the surface side of the disc is not indirectly displayed by a member such as a tray or a lid plate as in the conventional disc case, but directly displayed through the jacket.

Still another object of the present invention is to provide a disc accommodating case, which is provided with a transparent display window at a predetermined position in the vicinity of the center portion of the opaque disc case, and constructed so that a surface side display part provided at a part of the disc can be directly identified through the transparent display window.

Other objects and further features of the present invention will be apparent from the following detailed description when read in conjunction with the accompanying drawings.

BRIEF DESCRIPTION OF THE DRAWINGS

FIG. 1 is a disassembled perspective view showing an embodiment of a disc accommodating case according to the present invention, in a state where a surface side to be displayed is facing up;

FIG. 2 is a cross-sectional diagram showing the disc accommodating case shown in FIG. 1 along a line II—II;

FIG. 3 is a disassembled perspective view showing the embodiment of the disc accommodating case shown in FIG. 1, in a state where the other surface side to be displayed is facing up;

FIG. 4 is a diagram for explaining the state of the display through a display window; and FIGS. 5A and 5B are diagrams respectively showing other embodiments of a display part of the disc.

DETAILED DESCRIPTION

In FIGS. 1 and 3, a disc case 10 comprises a jacket 11 and a lid plate 12. The jacket 11 is assembled from a pair of jacket halves 13a and 13b, and comprises a flat cavity of space therein. This space is open at an opening 14 at the front side of the jacket 11 and is closed on the other three sides, and accommodates a disc 15. The thickness of the above space is slightly larger than that of the disc 15. The jacket halves 13a and 13b are, for example, made of opaque styrol resin (GPPS (General Purpose Poly-Styrene) 60%, HIPS (High Impact Poly-Sterene) 40%), and has a preferable flexibility so as to allow the enlarging of the opening 14, and also has a suitable hardness to protect the disc 15 accommodated therein.

The lid plate 12 comprises a plate-shaped main lid body 16 which is inserted into the front portion of the space through the opening 14 of the jacket 11 and closes the opening 14, and a rim portion 17 formed unitarily at the front edge of the main lid body 16, which is fixed to the front edge of the jacket 11 and does not enter within the opening 14. The lid plate 12 is, for example, made of acrylonitrile butadiene styrene (ABS) resin. An arcuate part 18 having a radius of curvature larger than the radius of the disc 15, is formed at the rear end part of the main lid body 16. A pair of engaging arms 19 and 19 which can be elastically deformed, are formed on both sides of the main lid body 16. A projection 20 which engages with a depression (not shown) provided at the inner side surface of the jacket 11, is provided at the outer side on each of the engaging arm 19.

Upon insertion of the lid plate 12 into a predetermined position within the jacket 11, the projection 20 engages into the depression in the side wall of the jacket 11, due to the flexibility of the engaging arm 19. Accordingly, the lid plate 12 is prevented from slipping out from the jacket 11. In the above state, the disc 15 accommodated within the jacket 11 makes contact with, the inner side wall of the jacket 11 with respect to the right and left directions, a projection 21 provided within the jacket 11 with respect to the backward direction, and the central portion of the arcuate part 18 of the lid plate 12 with respect to the forward direction. Thus, the disc 15 is restricted at a position within the jacket 11 due to the above contacts. Hence, in a state where the disc 15 is accommodated within the jacket 11 and the lid plate 12 is engaged with the jacket 11, the lid plate 12 and the disc 15 do not fall outside the jacket 11 even when the jacket 11 is shook. Moreover, the disc 15 is always at a predetermined position within the jacket 11 without making unnecessary contact with the jacket 11. In addition, dust particles are prevented from entering into the jacket 11, since the jacket 11 is closed by the lid plate 12.

Protrusive groove guards 15a and 15b are respectively formed at the outer peripheral part and the inner peripheral part of the disc 15, and information signals are recorded within a part 15c provided between the above groove guards 15a and 15b. A center hole 22 which fits over a position centering mechanism provided in relation to a turntable of a reproducing apparatus, is formed at the center part of the disc 15. The above construction of the disc 15 is the same with respect to a first side "1" (side A) 15A and a second side "2" (side B) 15B of the disc 15. However, on one predetermined side of the disc 15, that is, on the first side (side A) 15A, for example, a first side (side A) display portion 23 is formed in a ring shape, at a predetermined position within a flat part of the disc 15 between the inner groove guard 15b and the center hole 22.

When the color of the disc 15 is black, for example, the color of the display portion 23 is selected to a color which is easily distinguishable by the contrast in color between the disc 15 and the display portion 23. That is, the color of the display portion 23 is selected to white, for example, in the above case where the color of the disc 15 is black. In the present embodiment of the invention, the display portion 23 consists of a white-colored display line having a width of one mili-meter, which is adhered onto the disc 15 by use of a hot stamping method. The construction of the display portion 23 is not limited to that of the above embodiment, and the color of the display portion 23 can be of a color other than white. Further, the width of the display line can be large, to form a display band of a wide ring shape. However, in the present embodiment of the invention, the construction and color of the display portion 23 are selected as described above, since it is easier to distinguish the existence of the display portion 23 when a part of the white display line of the display portion 23 and a part of the black disc 15 can be seen simultaneously, as will be described hereinafter.

In the present embodiment of the invention, a display portion is not provided on the other side of the disc 15, that is, on the second side (side B) 15B of the disc 15, as shown in FIG. 3. However, a display portion of a different form from that of the display portion 23 provided on the first side (side A) 15A of the disc 15, such as a display line of a color other than white, for example, can be provided on the second side (side B) 15B of the disc 15.

A display window 24 is provided at a predetermined position in the vicinity of the center portion of one jacket half 13a of the jacket 11. The display window 24 consists of an opening 25 and a thin transparent sheet or plate 26 which is adhered from the inner side of the jacket 11 to cover the opening 25, as shown in FIG. 2. The transparent plate 26 is adhered within a depression formed around the opening 25, and the transparent plate 26 does not project from the inner surface (not shown) of the jacket half 13a. Accordingly, the transparent plate 26 does not make contact with the disc 15.

The display window 24 is provided at a position opposing the display portion 23 of the disc 15 which is accommodated within the jacket 11. Therefore, in a state where the disc 15 is inserted into the jacket 11 so that the first side (side A) 15A faces towards a direction opposing the jacket half 13a (so that the first side 15A faces upwards in FIG. 1), a part of the display portion 23 of the disc 15 can be seen directly through the transparent plate 26 provided at the opening 25. Thus, it can be recognized that the upper side of the disc 15 is the first side (side A) 15A of the disc 15.

In the present embodiment of the invention, a part of the white ring shaped display portion 23 crosses a substantially center portion of the display window 24 in the transverse direction as shown in FIG. 4. Since the color of the area on both sides of the white display line is black, which is a part of the disc 15, the white display portion 23 can be seen clearly and easily due to the contrast in color.

In a case where the disc 15 is inserted into the jacket 11 so that the second side (side B) 15B faces towards a direction opposing the jacket half 13a, the display portion 23 cannot be seen through the display window 24, and only the black color of the disc 15 is visible.

Accordingly, in this case, it is recognized that the upper side of the disc 15 is the second side (side B) 15B of the disc 15. Hence, regardless of whether which side of the disc 15 is facing up and accommodated within the reproducing apparatus, the side of the disc 15 can easily be recognized. When an empty jacket 11 is inserted into the reproducing apparatus to recover the disc 15, the jacket 11 can be inserted into the reproducing apparatus to accommodate the disc 15 within the jacket 11 by disregarding the relationship between the playing side of the disc 15 and the surface side of the jacket 11, by arbitrarily inserting the jacket 11 so that the surface side of the jacket faces either one of the two possible directions.

Thus, according to the case for accommodating a disc of the present invention, the operation efficiency is improved when the case for accommodating a disc is to be assembled by accommodating the disc 15 into the disc case 10 and closing the disc case 10 by the lid plate 12, since the side of the disc can be seen directly, and there is no need to consider the relationship between the surface side of the disc 15 and the surface side of the lid plate 12 as in the conventional case.

In the above embodiment of the invention, the display window 24 is only provided on one jacket half 13a. However, display windows can respectively be provided on the pair of jacket halves 13a and 13b. In this case, the jacket halves 13a and 13b can be formed from the same mold.

When the size of the display window 24 is set at a size in the range of the inner groove guard 15b, warps and deformation are easily formed in the flat portion of the jacket half which is formed from a resin. Furthermore, parts of the disc 15 which are not required for displaying the surface side of the disc 15 are also seen through the display window 24 in this case, and the recognition of the display portion may become difficult. Hence, in the above embodiment of the invention, the dimension of the display window 24 is set relatively small, that is, so that one side of the display window 24 is in the order of few mili-meters or ten-odd mili-meters. Since the display window 24 is relatively small and provided at a position substantially at the center portion of the jacket half, the evenness of the flat surface of the jacket half is not lost due to the existence of the display window.

In addition, since the display portion 23 is formed in a ring shape in the above embodiment of the invention, a part of the display portion 23 always opposes the display window 24 regardless of the rotational position of the disc 15, accommodated within the jacket 11, whereby the display of the surface side of the disc 15 can be positively obtained.

The display portion 23 is of a white ring shaped line (band) in the above embodiment of the invention, however, the configuration and shape of the display portion can be of any form, as long as the surface side of the disc 15 can be recognized through the display window 24. For example, as shown in FIGS. 5A and 5B wherein a part of the display portion is omitted, a display portion 23A and a display portion 23B can be used. In the display portion 23A, numbers "1" which indicate the surface side of the disc 15, are arranged and provided in a ring form on the inner side of the inner groove guard 15b, on the first side (side A) of the disc 15. On the other hand, in the display portion 23B, numbers "2" which indicate the surface side of the disc 15, are arranged and provided in a ring form on the inner side of the inner guard groove 15b, on the second side (side B) of the disc 15. Letters "A" and "B" can be used instead of the numbers "1" and "2". In the above case, the size and shape of the numbers or letters are of course selected so that at least one number or letter is visible through the display window 24.

Further, this invention is not limited to these embodiments but various variations and modifications may be made without departing from the scope of the invention.

What is claimed is:

1. A disc accommodating case comprising:
    an opaque jacket having an opening portion at one end thereof, for accommodating a disc having information signals, said disc being received within an internal space formed between a pair of jacket halves of said jacket; and
    a lid member for closing the opening portion of the jacket accommodating said disc,
    said disc having a portion on one surface side thereof where a ring shaped display line is marked concentrically with the disc, a corresponding portion on the other surface side of the disc having no such display line,
    said jacket having a display window on one of the jacket halves at a position opposing a part of the display line on said disc when the disc is accommodated with the case with said one surface side of the disc opposing said one of the jacket halves, for enabling only the part of said display line to be seen through said display window from outside said jacket regardless of the rotational position of the disc with respect to the jacket, whereby the surface side of the disc opposing the window is identified dependent on whether the part of the display line is visible through said window.

2. A disc accommodating case as claimed in claim 1 in which said disc has an outer groove guard and an inner groove guard respectively provided at the outer and inner peripheral parts thereof, and a center hole formed at the center thereof, and said display portion is formed at a position on said disc which is between said inner groove guard and said center hole.

3. A combination of a disc and a disc accommodating case comprising:
   an opaque jacket having an opening portion at one end thereof, for accommodating a disc having information signals recorded thereon, said disc being received within an internal space formed between a pair of jacket halves of said jacket; and
   a lid member for closing the opening portion of the jacket accommodating the disc,
   said disc having a portion on one surface side thereof where a ring shaped display line is marked concentrically with the disc, a corresponding portion on the other surface side of the disc having no such display line,
   said jacket having a display window on one of the jacket halves at a position opposing a part of the display on said disc when the disc is accommodated within the case with said one surface of the disc opposing said one of the jacket halves, for enabling only the part of said display one to be seen through said display window from outside said jacket regardless of the rotational position of the disc with respect to the jacket, whereby the surface side of the disc opposing the window is identified dependent on whether the part of the display line is visible through said window.

* * * * *

UNITED STATES PATENT AND TRADEMARK OFFICE
CERTIFICATE OF CORRECTION

PATENT NO. : 4,428,483

DATED : January 31, 1984

INVENTOR(S) : Osamu Narita and Takushi Hayashi

It is certified that error appears in the above-identified patent and that said Letters Patent is hereby corrected as shown below:

Column 8, Claim 3, line 6, after "display" insert --line--;
Column 8, Claim 3, line 7, after "surface" insert --side--;
Column 8, Claim 3, line 9, change "one" to --line--.

Signed and Sealed this

Thirty-first Day of July 1984

[SEAL]

*Attest:*

GERALD J. MOSSINGHOFF

*Attesting Officer*     *Commissioner of Patents and Trademarks*